(12) United States Patent
Yamamoto

(10) Patent No.: US 6,476,855 B1
(45) Date of Patent: Nov. 5, 2002

(54) SURROUNDING MONITOR APPARATUS FOR A VEHICLE

(75) Inventor: Yasuhide Yamamoto, Tokyo (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/318,434

(22) Filed: May 25, 1999

(30) Foreign Application Priority Data

May 25, 1998 (JP) .......................................... 10-142577

(51) Int. Cl.[7] .................................................. H04N 7/18
(52) U.S. Cl. ........................ 348/148; 348/152; 348/159
(58) Field of Search ................................. 348/148, 143, 348/150, 152, 153, 159; 340/461, 901, 937; 359/896; 382/104, 283

(56) References Cited

U.S. PATENT DOCUMENTS

| | | | | |
|---|---|---|---|---|
| 5,222,159 A | * | 6/1993 | Kawamura et al. | 382/283 |
| 5,289,321 A | * | 2/1994 | Secor | 359/896 |
| 5,574,443 A | * | 11/1996 | Hsieh | 340/901 |
| 5,670,935 A | * | 9/1997 | Schofield et al. | 340/461 |
| 5,680,123 A | * | 10/1997 | Lee | 340/937 |
| 5,809,161 A | * | 9/1998 | Auty et al. | 382/104 |

FOREIGN PATENT DOCUMENTS

JP 10-104765 4/1998

* cited by examiner

*Primary Examiner*—Howard Britton
*Assistant Examiner*—Allen Wong
(74) *Attorney, Agent, or Firm*—McDermott, Will & Emery (57) ABSTRACT

A trimming video image including a mask region (20) having vehicle side window shapes and a vehicle image (36) which are formed by an image forming device are overlapped on pickup video images of a CCD camera obtained by picking up the left and right forward images of a vehicle to form a synthesized image, and the synthesized image is displayed on a display device. Since the left and right pickup video images are displayed in display regions (11, 21) having side window shapes, respectively, and the vehicle image (36) is additionally used, the direction of a displayed pickup video image (track T or man M) is intuitively recognized.

7 Claims, 12 Drawing Sheets

SURROUNDING MONITOR APPARATUS FOR A VEHICLE

BACKGROUND OF THE INVENTION

1. Field of the Invention

The present invention relates to a surrounding monitor apparatus for a vehicle which causes a camera to pick the image of a blind spot where a field of view is shielded from a driver seat of a vehicle and makes a driver recognize the surrounding of the vehicle by a display screen for displaying a video image and, more particularly, to a surrounding monitor apparatus for making a driver intuitively recognize the image pickup direction of a video image when video images having image pickup directions are displayed on one screen.

2. Description of the Related Art

When a vehicle running on an alley along which a driver cannot see far ahead will go out into a main road, the driver may not check both ways until the vehicle advances to a position where the front end of the vehicle is stuck into the forward road. In this case, when a CCD camera is attached to the front bumper of the vehicle end, and left and right situations on the road are displayed on a display device in the vehicle room as a video image, the driver can check the left and right situations on the road until the driver moves the vehicle to the position where the driver can directly visually check the left and right situations.

SUMMARY OF THE INVENTION

Figure 1:
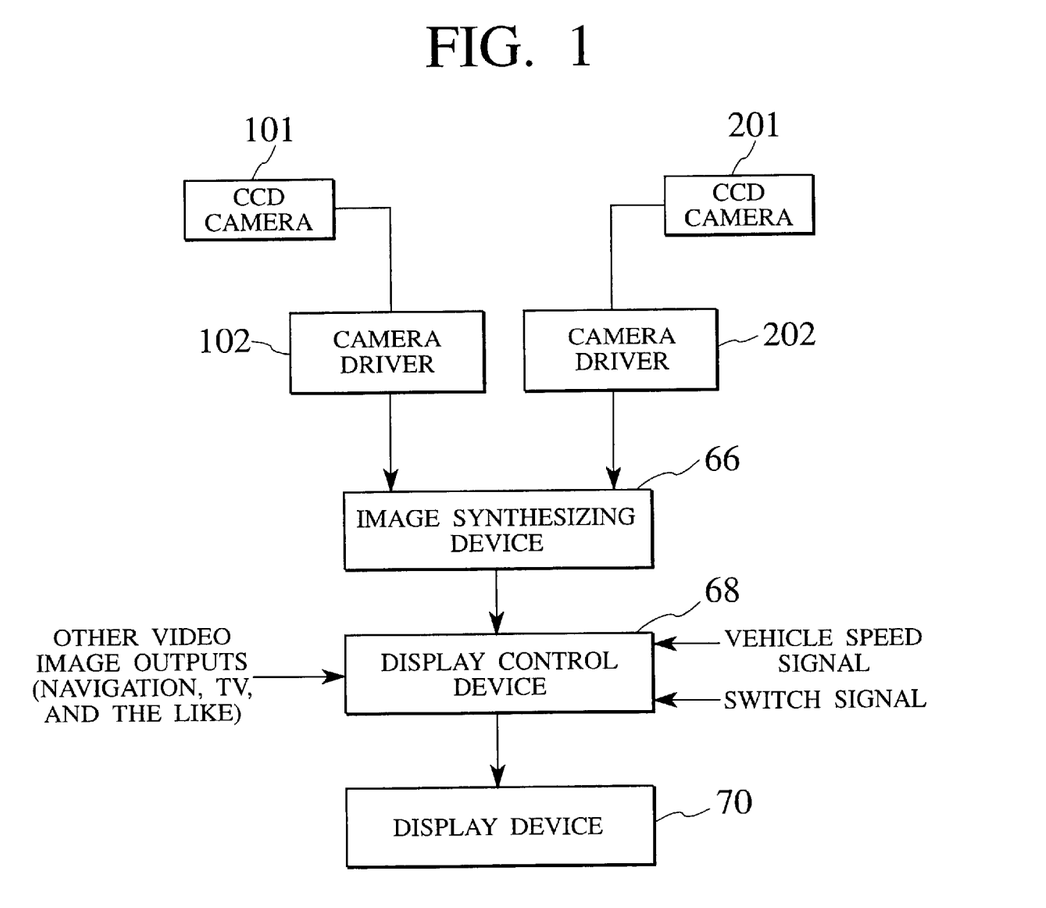
FIG. 1 is a block diagram showing an example of a surrounding monitor apparatus for a vehicle.

As an apparatus proposed on the basis of the above consideration, there is an apparatus shown in FIG. 1. CCD cameras 101 and 201 for picking up the images of left and right forward blind spots are arranged on both the side surfaces of the front bumper of a vehicle. The CCD camera 101 arranged on the left side of the bumper and the CCD camera 201 arranged on the right side are connected to an image synthesizing device 66 through camera drivers 102 and 202 to output pickup video images.

In the image synthesizing device 66, the two left and right pickup video images are arranged to be synthesized with each other as one video image. The synthesized video image is output to a display control device 68 together with navigation information or a television (TV) image. This display control device 68 selects one from the video image, the navigation information, and the television image by a switch signal or a vehicle speed signal, and outputs and displays the selected image or information to and on a display device 70. The switch signal is a signal of a switch operated when display screens are switched. The vehicle speed signal performs an operation of automatically switching a present display to a navigation information display when a vehicle speed reaches a predetermined value, and when a monitor video image is not necessary.

Figure 2:
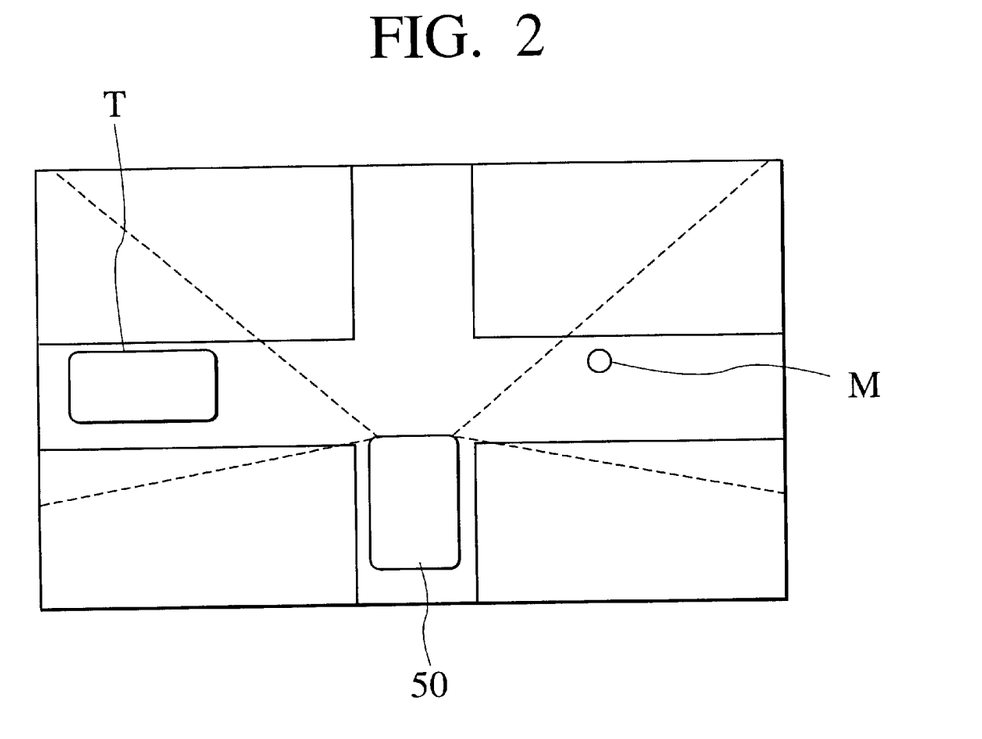
FIG. 2 is a diagram showing an image pickup range.
Figure 3:
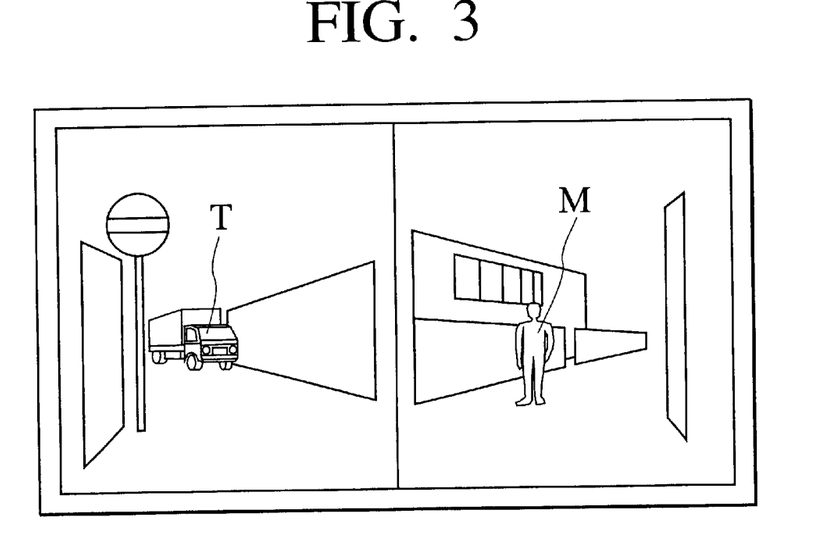
FIG. 3 is a diagram showing a display example.

By arranging the apparatus on a vehicle, for example, as shown in FIG. 2, even in road situations that a road is surrounded by walls, that a field of view is shielded, that far ahead cannot be seen, and that visual check cannot be made, when the front end of a vehicle (own vehicle) 50 is slightly stuck into the forward road, the left and right sides are set within an image pickup range to be subjected to an image pickup operation. In the display device, for example, a pickup image as shown in FIG. 3 is displayed. A track T is displayed on the left of the display image, and a man M is displayed on the right, so that the road situations can be checked.

However, since, in the above image display, video images picked up at the left and right fronts are arranged to be displayed on one screen, the images are not impressed as images picked up in the left and right directions. It is disadvantageously difficult to intuitively position an object or a man on the basis of the image.

This embodiment has been made in consideration of the problem and, has as its object to provide a surrounding monitor apparatus for a vehicle in which a feeling of direction is given to a display video image.

According to one aspect of the present invention, there is provided a surrounding monitor apparatus for a vehicle, comprising: an image pickup device for picking up images in a plurality of different directions from a vehicle; an image forming device for forming a trimming video image picked up by the image pickup device and including mask regions having the shapes of vehicle windows corresponding to the plurality of directions and a vehicle image; an image synthesizing device for overlapping the trimming video image and the vehicle image formed by the image forming device on the plurality of video images picked up by the image pickup device to form a synthesized image; and a display device for displaying the synthesized image from the image synthesizing device.

DETAILED DESCRIPTION OF THE PREFERRED EMBODIMENTS

Embodiments of the present invention will be described below.

Figure 4:
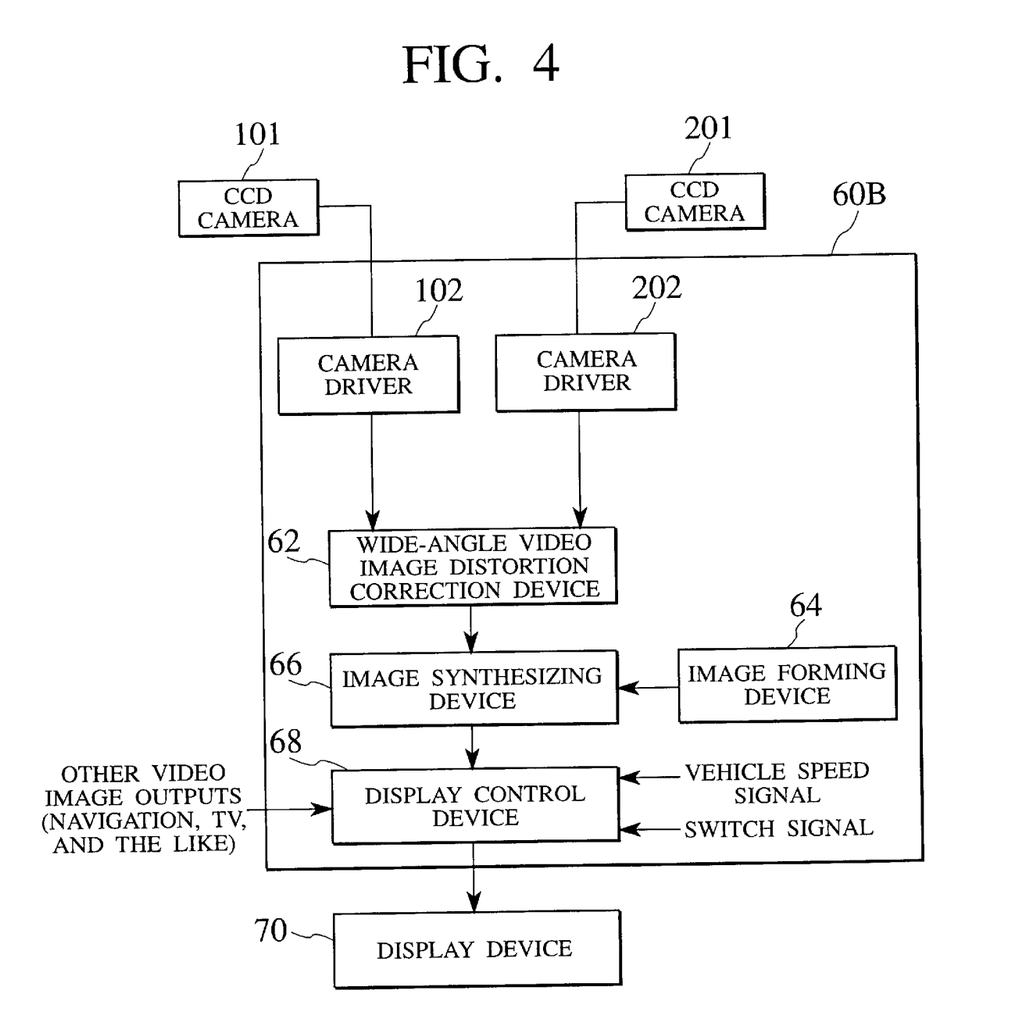
FIG. 4 is a block diagram showing the arrangement of the first embodiment of a surrounding monitor apparatus for a vehicle according to the present invention.

FIG. 4 is a block diagram showing the first embodiment.

A surrounding monitor apparatus for a vehicle according to this embodiment is constituted by CCD cameras 101 and 201, a control unit 60, and a display device 70.

Figure 5:
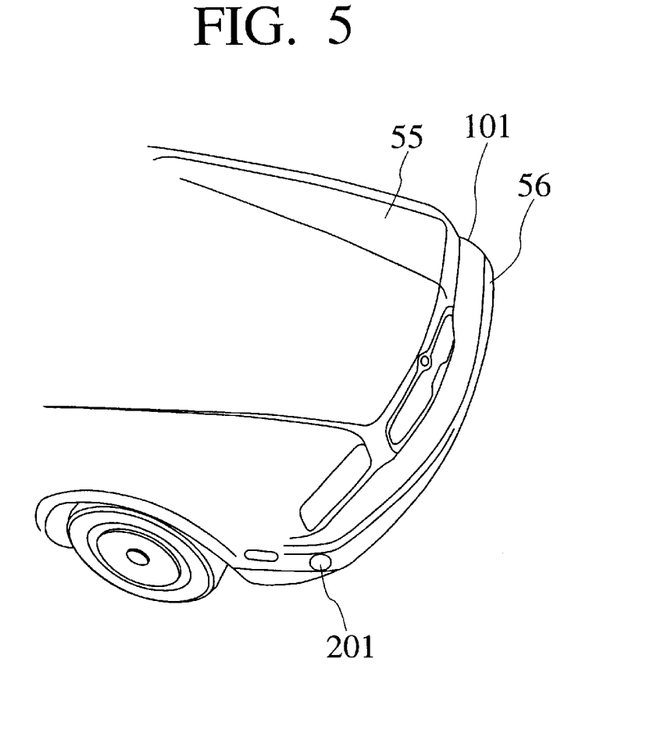
FIG. 5 is a diagram showing portions at which CCD cameras are arranged in this embodiment.

The CCD camera 201, as shown in FIG. 5, is arranged at the right corner of a front bumper 56 formed at the front end of a vehicle 55. The CCD camera 101 is arranged at a position, which is symmetrical about the vehicle center, of the front bumper 56.

Figure 6:
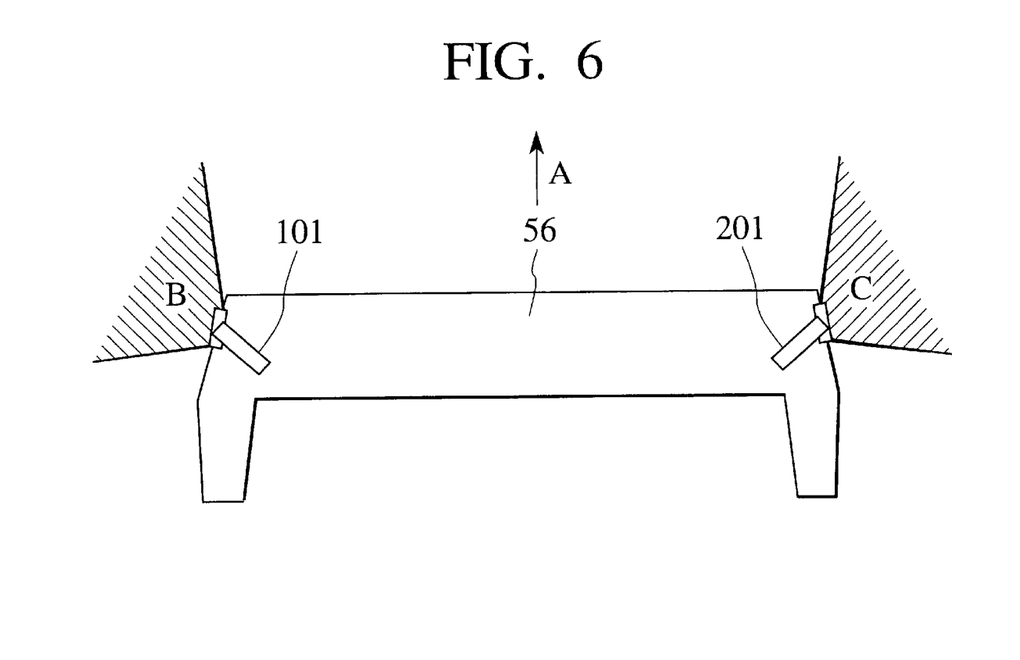
FIG. 6 is a diagram showing the situations of the CCD cameras attached to the front bumper and image pickup ranges.

The CCD cameras 101 and 201, as shown in FIG. 6, are fixed from the rear surface of the front bumper 56 with fixing members. A window consisting of a transparent resin is arranged in front of each CCD camera.

The CCD cameras 101 and 201 have wide angle lenses to pick up the images of a left forward area B and a right forward area C of the vehicle through the windows. In FIG. 6, an arrow A indicates an advance direction of the vehicle.

Returning to FIG. 4, video signals of the CCD cameras are displayed on the display device 70 through the control unit 60 arranged in the vehicle room. The display device 70 can also display navigation information, a video image of television (TV), or the like.

The control unit 60 is functionally constituted by camera drivers 102 and 202, a wide-angle video distortion correction device 62, an image synthesizing device 66, an image forming device 64, and a display control device 68.

The CCD cameras 101 and 201 are connected to the wide-angle video distortion correction device 62 through the camera drivers 102 and 202, respectively.

The image pickup device of the present invention are constituted by the CCD cameras 101 and 201 and the camera drivers 102 and 202.

The wide-angle video distortion correction device 62 corrects video distortion caused by the wide angle lenses to output corrected video signals to the image synthesizing device 66.

The image forming device 64 is connected to the image synthesizing device 66.

The image forming device 64 forms a trimming video image and a vehicle image (to be described later). The image synthesizing device 66 synthesizes video signals from the two CCD cameras as one image to form a monitor image such that the image is overlapped on the trimming video image and the vehicle image from the image forming device 64.

The video signal from the image synthesizing device 66 and other video signals of navigation, television, and the like are input to the display control device 68. As control signals, a vehicle speed signal and a switch signal are input. The switch signal is a signal generated by a switch operated when display screens are switched.

The display control device 68 receives a switch signal to output an image signal corresponding to the switch signal to the display device 70. When the vehicle speed exceeds a predetermined value, control for displaying only, e.g., navigation information is performed.

The display device 70 displays a navigation video image and a TV video image, and selectively displays a monitor image.

A video image formed by the image forming device 64 will be described below.

Figure 7:
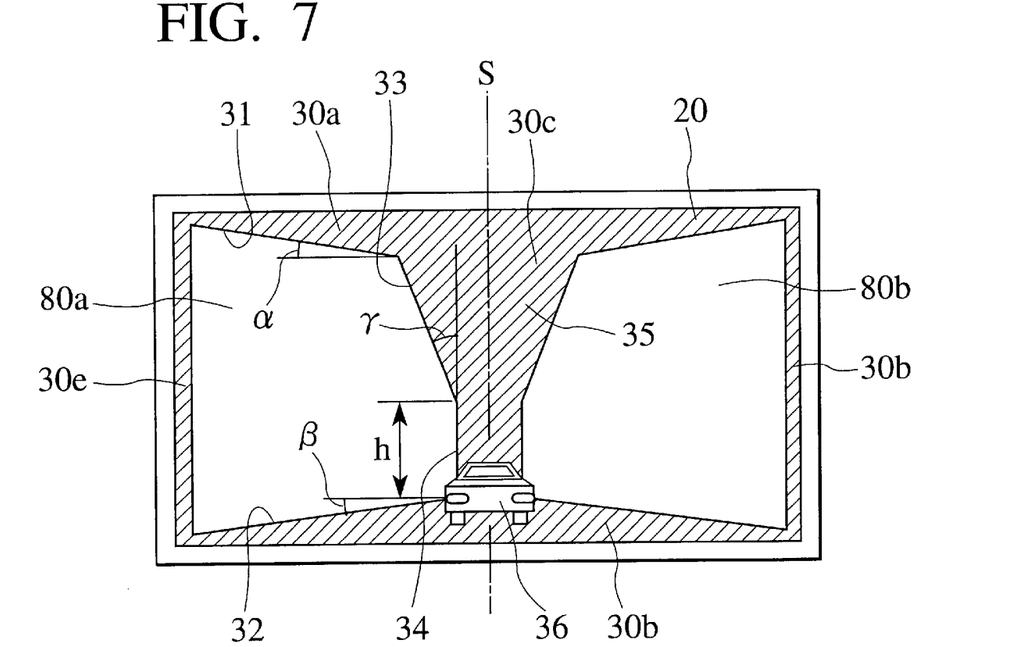
FIG. 7 is a diagram showing a trimming video image and a vehicle image in the embodiment.

FIG. 7 shows an image formed such that a vehicle image is overlapped on a trimming video image in which a mask region 20 is formed on the display screen of the display device 70.

The trimming video image is constituted by an upper mask region 30a for shielding an upper region of the display screen of the display device 70, a lower mask region 30b for shielding a lower region of the display screen of the monitor, a central mask region 30c for shielding a central portion of the monitor, a right mask region 30d for shielding a region along the right side of the display screen, and a left mask region 30e for shielding a region along the left side of the display screen.

Lower edges 31 of the upper mask region 30a extending from the connection portions between the upper mask region 30a and the central mask region 30c are inclined upward at angles α with respect to the horizontal line of the display screen.

Upper edges 32 of the upper mask region 30a extending from the connection portions between the lower mask region 30b and the central mask region 30c are inclined downward at angles β with respect to the horizontal line.

The width of a region surrounded by side edges 34 extending from the connection portions between the central mask region 30c and the lower mask region 30b with predetermined heights h is constant, and side edges 33 are inclined at angles γ with respect to a vertical line until the side edges 33 are connected to the upper mask region 30a to form a width-extending portion 35 including a region whose width increases upward.

The values of α, β, γ, and h are set such that display regions 80a and 80b partitioned by mask regions 30a, 30b, 30c, 30d, and 30e depending on the image pickup angles of the CCD cameras can be associated with the left and right windows.

In this manner, the trimming video image which is horizontally symmetrical about a vertical center line S of the display screen and associated with window shapes when viewed from an oblique direction is formed by the image forming device 64. The image forming device 64 also forms a vehicle image 36 obtained by viewing the vehicle from behind.

The width of the vehicle image 36 is slightly larger than the width of the region surrounded by the side edges 34. As shown in FIG. 7, The vehicle image 36 is positioned by the image synthesizing device 66 such that the bumper of the vehicle is located at a crossing point between the upper edge 32 of the lower mask region 30b and the side edge 34 of the central mask region 30c, and the vehicle image 36 is synthesized with the trimming video image.

The vehicle image 36 obtained by viewing the vehicle from behind calls such an image that window frames are positioned on both the left and right sides of the vehicle.

The image synthesizing device 66 synthesizes the video image of the CCD camera 101 and the video image of the CCD camera 201 on the left and right sides of the video image obtained by synthesizing the trimming video image by the mask region 20 with the vehicle image 36 obtained by viewing the vehicle from behind. In this synthesis, a video image boundary between the CCD camera 101 and 201 is made equal to a vertical center line S of the mask region.

This embodiment is constituted as described above, and video images obtained by picking up the left and right forward images are displayed on the regions partitioned by the mask region 20 of the trimming video image for imaging the vehicle windows, and the vehicle image 36 obtained by viewing the vehicle from behind is additionally displayed as a video image. For this reason, the positional relationship between the own vehicle and the display video image becomes clear, and recognition that a driver sees the left and right video images is improved.

Figure 8:
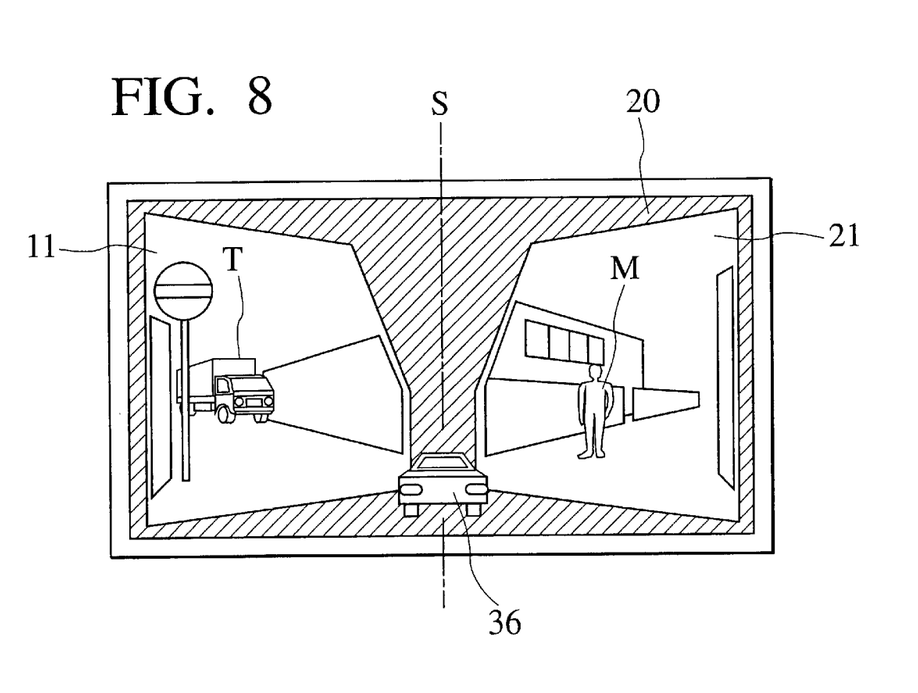
FIG. 8 is a diagram showing a display image obtained by synthesizing a pickup video image, a trimming video image, and a vehicle image with each other.

As a result, at a crossing surrounded by walls and having a field of view which is shielded, when the front end of the vehicle is slightly stuck into forward road, a display image as shown in FIG. 8 can be obtained, and the left and right blind spots can be monitored. When an image obtained by calling a vehicle image and a trimming video image is added to the display shown in FIG. 3, the video images 11 and 12 of the display regions partitioned by the mask region 20 can be intuitively understood as the left and right forward video images of the vehicle.

It is understood that, in the display image shown in FIG. 8, a track T and a man M are present on the left and right. It can be determined by checking the moving directions of the track T and the man M whether the track T and the man M are approaching the own vehicle.

Figure 9:
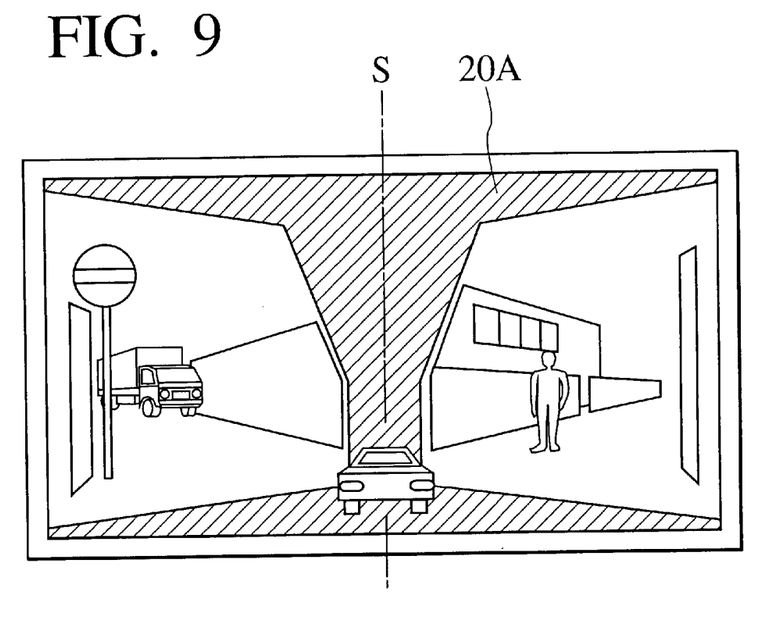
FIG. 9 is a diagram showing a modification of a mask region.
Figure 10:
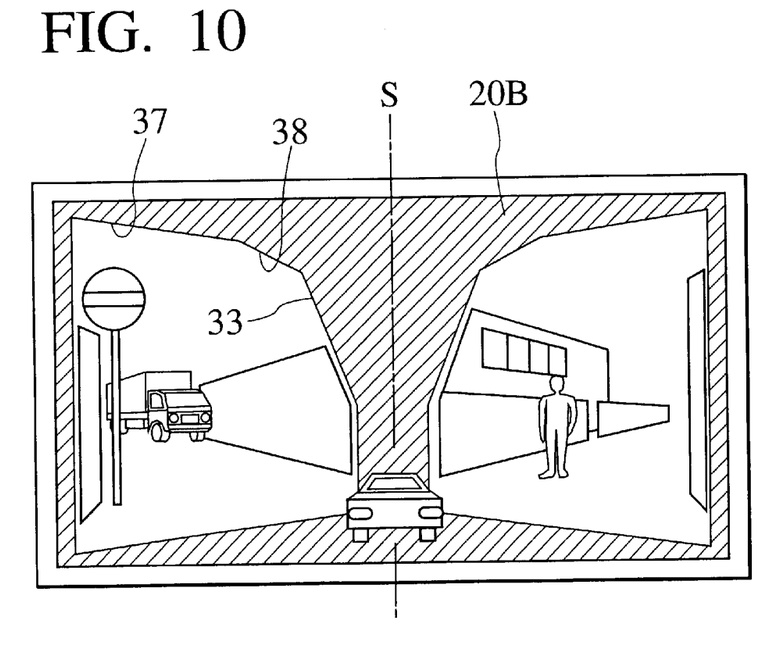
FIG. 10 is a diagram showing a modification of a mask region.
Figure 11:
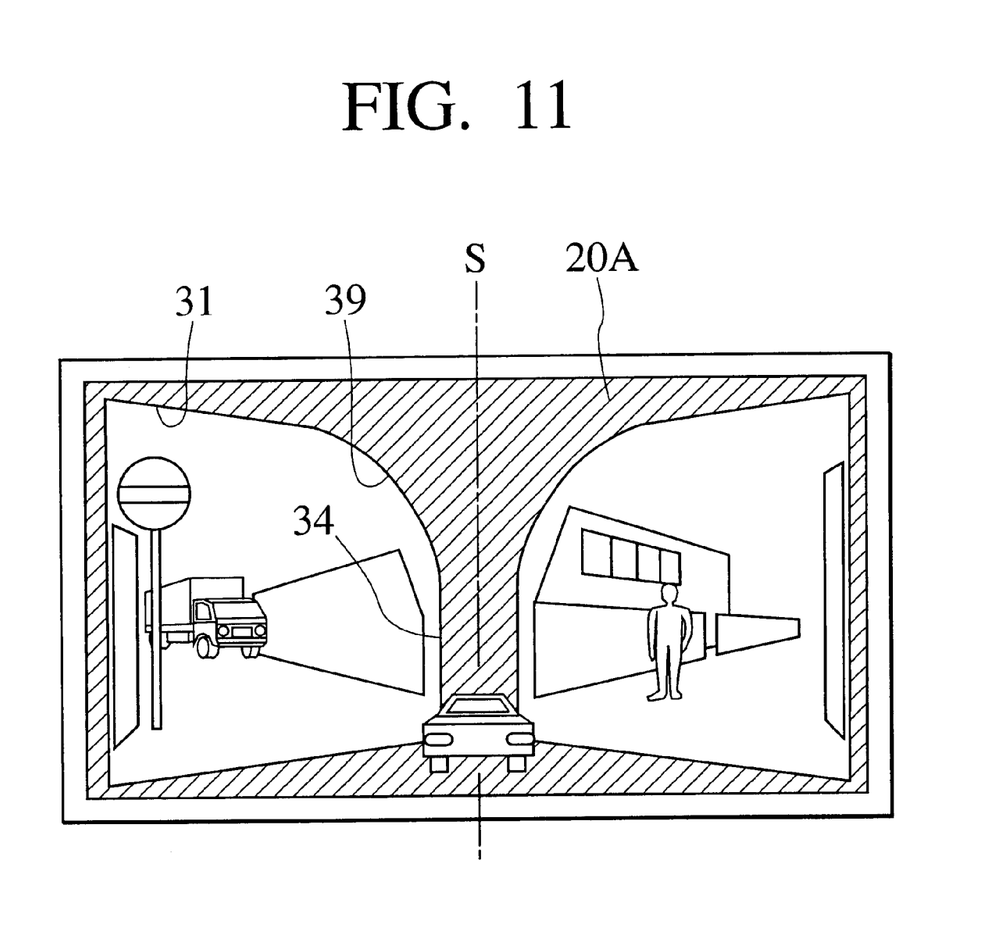
FIG. 11 is a diagram showing a modification of a mask region.

FIGS. 9 to 11 show modifications of mask regions.

A mask region 20A in FIG. 9 is obtained by omitting the right mask region 30d for shielding the right region of the display screen and the left mask region 30e for shielding the left region of the display screen from the mask region 20 shown in FIG. 7.

A mask region 20B in FIG. 10 is obtained such that two types of straight lower edges 37 and 38 are used in place of lower edges 31 in the upper mask region 30a in the mask region 20 shown in FIG. 7. The angle of the lower edge 37 is set to be equal to the angel of the lower edge 31 in FIG. 7. The lower edges 38 are set to be bent downward with respect to the lower edges 38. The angle is set such that a display region to be formed can be associated with the left and right windows.

A mask region 20C in FIG. 11 is obtained such that lower edges 31 and the side edges 34 are smoothly joined to each other by curved edges 39 in place of the straight side edges 33 at the width-extending portion in the central mask region 30c of the mask region 20 shown in FIG. 7.

With the modifications described above, an advantage that the displayed pickup video image can be intuitively understood as the left and right video images of the vehicle can be obtained.

Figure 12:
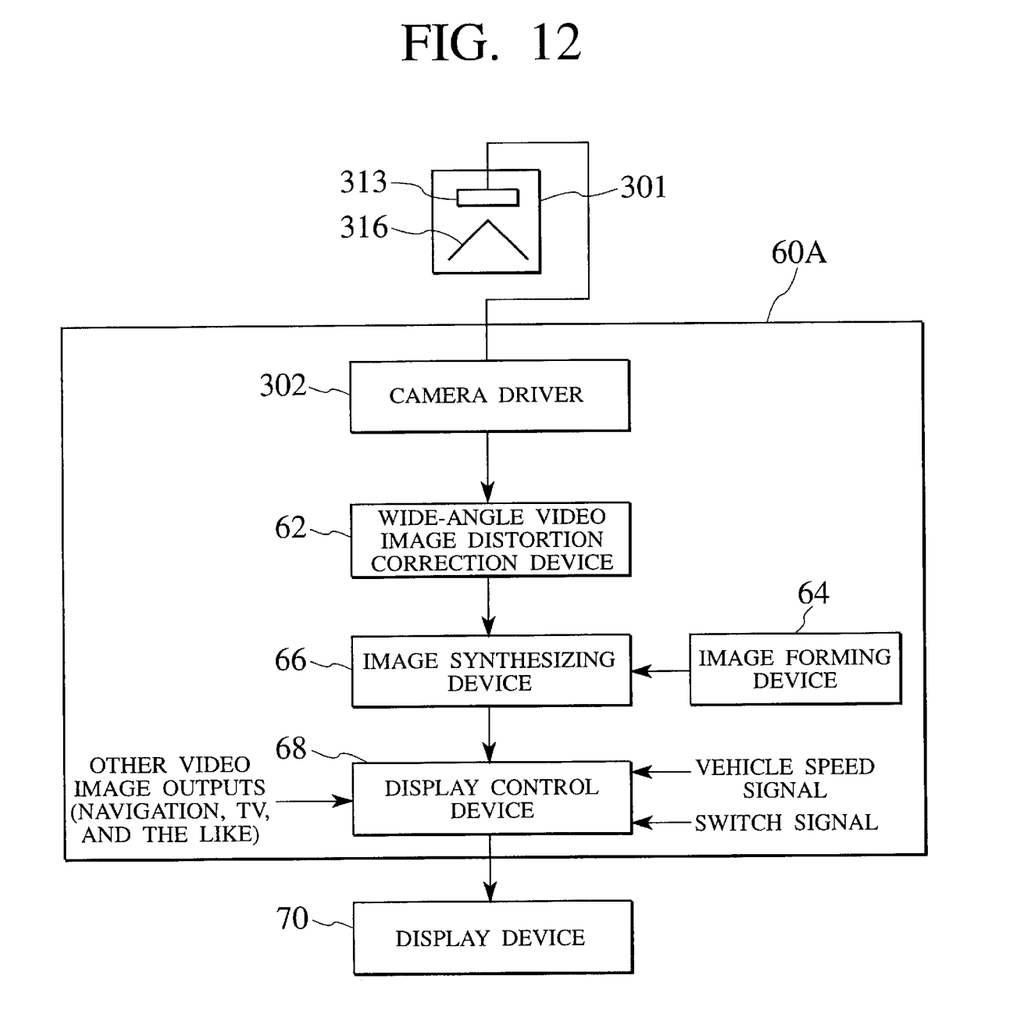
FIG. 12 is a block diagram showing the arrangement of the second embodiment.

FIG. 12 shows the second embodiment. Although the first embodiment is formed such that the CCD cameras which face outside are arranged at both the ends of the front bumper, a camera 301 with V-shaped mirror which causes a V-shaped mirror to guide left and right video images to a CCD element and to perform an image pickup operation is used in place of two CCD cameras in the second embodiment.

Figure 13:
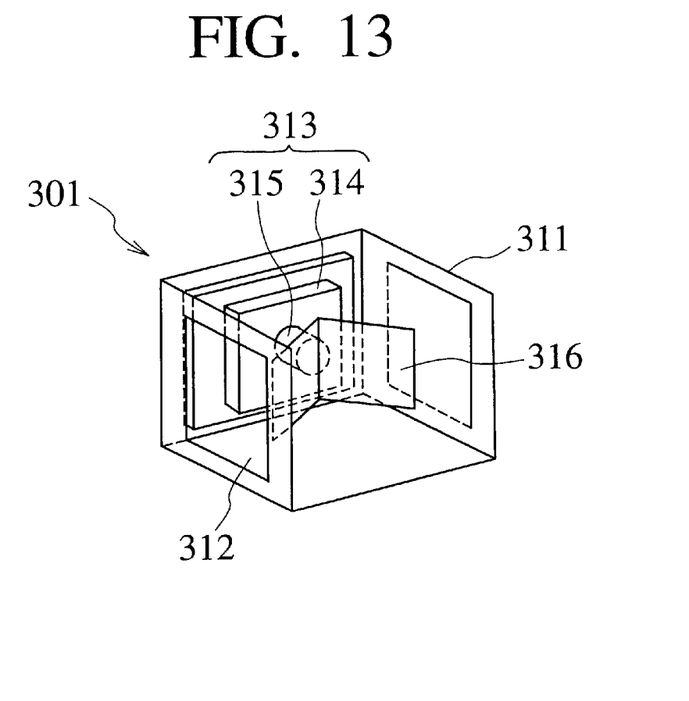
FIG. 13 is a diagram showing the arrangement of a camera with V-shaped mirror.

FIG. 13 shows the arrangement of the camera 301 with V-shaped mirror. A camera body 313 constituted by a optical system 315 including a lens and a CCD element 314 is arranged in a box-like case 311 having windows 312 formed in both the side surfaces thereof. A V-shaped mirror 316 constituted by two planar mirrors is arranged opposite to the optical system 315 on the optical axis. The angle formed by both the planar mirrors of the V-shaped mirror 316 is set to be larger than 90°, and the depth position of the V-shaped mirror 316 is set such that the left and right forward images from the windows 312 reach the CCD element 314.

Figure 14:
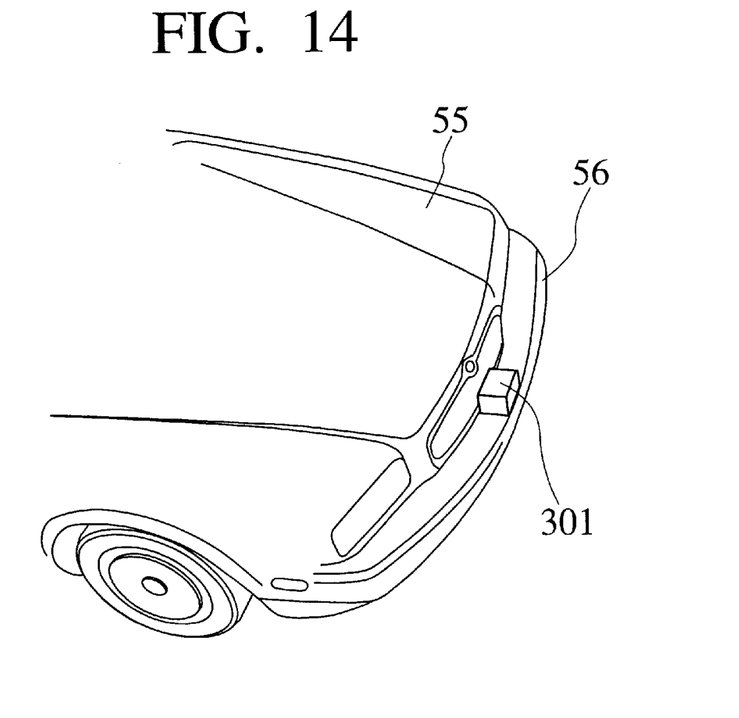
FIG. 14 is a diagram for explaining a portion at which the camera with V-shaped mirror is arranged.

In the camera 301 with V-shaped mirror arranged as described above, as shown in FIG. 14, is arranged at a central portion of the front bumper 56 of the vehicle 55 such that the V-shaped mirror is on the bumper side, and the camera body 313 is in an advance direction. In this manner, the left and right forward images of the vehicle are picked up by the camera body 313 by reflection of the reflective surfaces of the mirrors.

Returning to FIG. 12, a control unit 60A, as in the first embodiment, is constituted by functional blocks such as a camera driver 302, a wide-angle video distortion correction device 62, an image synthesizing device 66, a display control device 68, and an image forming device 64. These functions are the same as those in the first embodiment.

A video image signal output from the CCD element 314 of the camera 301 with V-shaped mirror is output to the wide-angle video distortion correction device 62 through the camera driver 302. In the wide-angle video distortion correction device 62, distortion of the wide angle lens is corrected. A corrected video image signal is output to the image synthesizing device 66.

In the image synthesizing device 66, a pickup video image, a trimming video image, and a vehicle image formed by mm the image forming device 64 are synthesized with each other to form a monitor image to be displayed by a display device 70. The trimming video image and the vehicle image formed by the image forming device 64 are the same as those in the first embodiment.

A monitor image is selected by the display control device 68 and output to the display device 70 to be displayed on the display device 70.

In this embodiment, the same effect as that in the first embodiment can be obtained, only one CCD camera may be used by using a mirror, and image synthesis of a plurality of CCD cameras is not necessary. For this reason, image processing becomes simple. In the second embodiment, the various mask shapes described as the modifications can be used.

Figure 15:
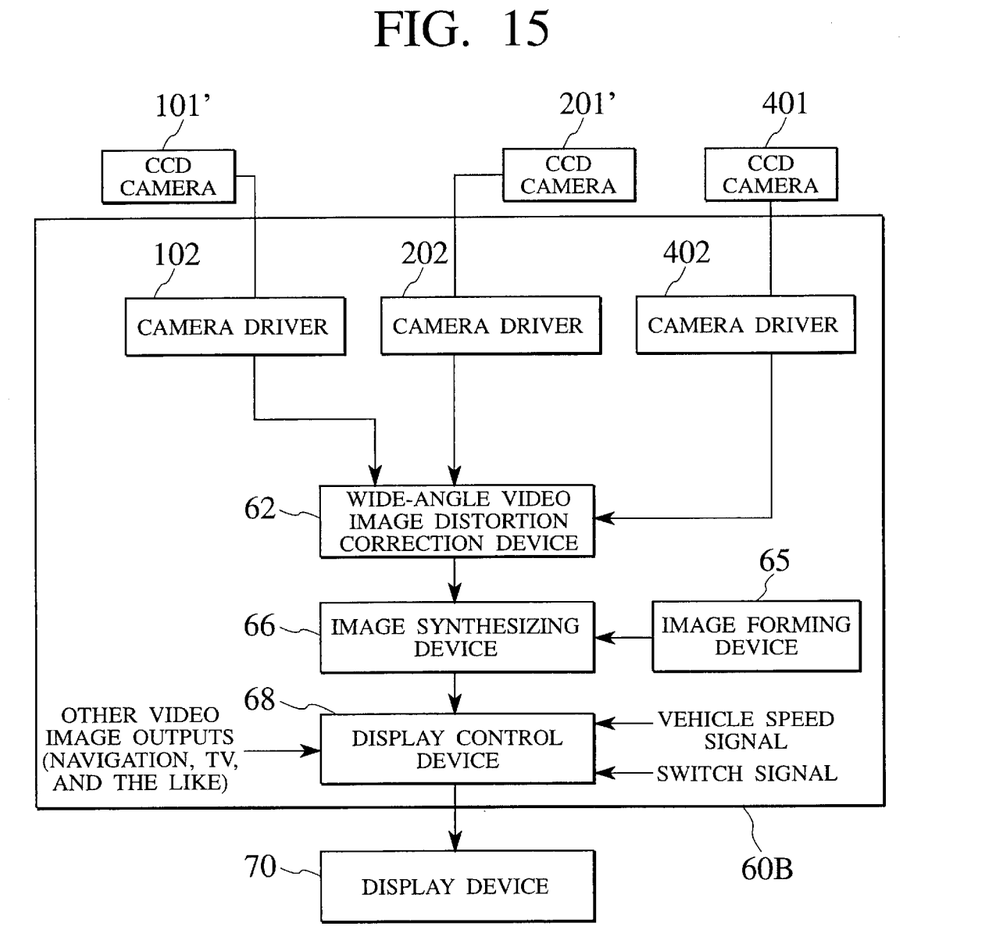
FIG. 15 is a block diagram showing the arrangement of the third embodiment.

FIG. 15 is a block diagram showing the third embodiment. In this embodiment, a rear blind spot of a vehicle is monitored, and CCD cameras 101' and 201' and a CCD camera 401 for picking up an image in a just backward direction which is the third direction are arranged.

The CCD cameras 101' and 201' are arranged at both the corners of the rear bumper, and the CCD camera 401 for picking up the image in the just backward direction is arranged at a central portion of the rear bumper. In this manner, an image pickup range which can cover an area of about 180° or more can be assured.

The CCD cameras 101', 102', and 401, as in the first embodiment, are connected to a display device 70, which is arranged at a rear portion in the vehicle room to face backward, through a console unit 60B. The console unit 60B performs the same processes as those in the first embodiment.

The CCD cameras 101', 102', and 401 are output to the wide-angle video distortion correction device 62 through camera drivers 102, 202, and 402, respectively.

In this embodiment, an image pickup device according to the present invention is constituted by the CCD cameras 101', 102', and 401 and the camera drivers 102, 202, and 402.

The wide-angle video distortion correction device 62 corrects distortions of wide angle lenses for respective images.

An image synthesizing device 66 synthesizes video images from the CCD cameras 101', 102', and 401 with each other, and overlaps the synthesized image on a trimming image and a vehicle image output from an image forming device 65 to form a monitor image.

The monitor image output from the image synthesizing device 66 is subjected to selection in a display control device 68, and then displayed on the display device 70.

Figure 16:
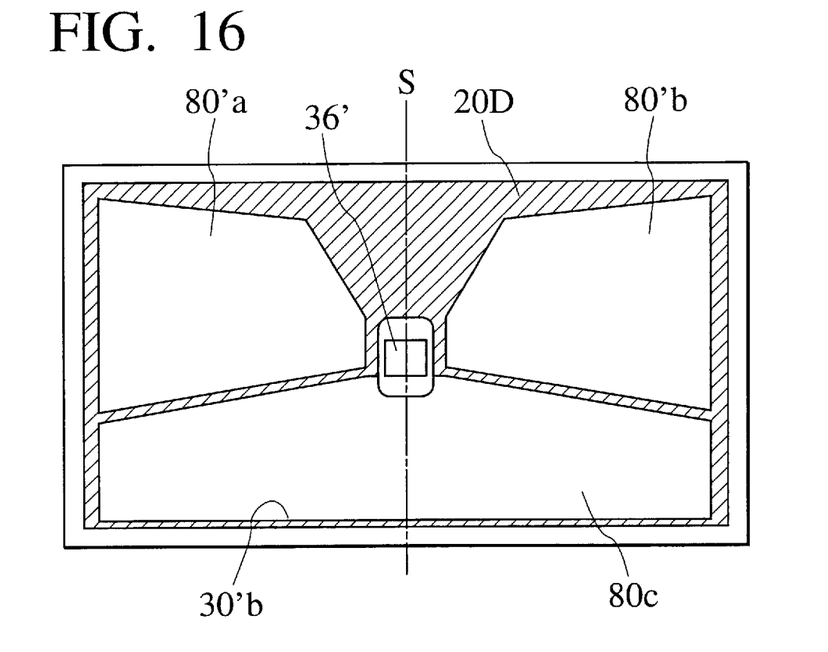
FIG. 16 is a diagram showing a trimming video image and a vehicle image in the third embodiment.

FIG. 16 shows a trimming video image and a vehicle image formed by the image forming device 65.

More specifically, a mask region 20D in which a trimming video image is formed, as in the first embodiment, display regions 80'a and 80'b including left and right video images are separately formed on the left and right sides. However, the height of a lower mask region 30'b is larger than that of the lower mask region of the first embodiment in FIG. 7. A display region 80C for displaying a just backward video image as the third display region is formed on the lower side of the display regions 80'a and 80'b.

The display region 80C is formed in the lower mask region 30'b and separated from other display regions by masks having equal widths, a pentagonal display region which is horizontally symmetrical about a vertical center line S of the display screen.

The image forming device 65 forms a vehicle image 36' obtained by viewing the vehicle from the top to give a feeling of direction to the left and right images serving as a vehicle image.

The image synthesizing device 66 synthesizes a vehicle image 36' with the trimming video image obtained by the mask region 20D, and synthesizes the images such that the left and right rear pickup images are positioned in the respective display regions.

Figure 17:
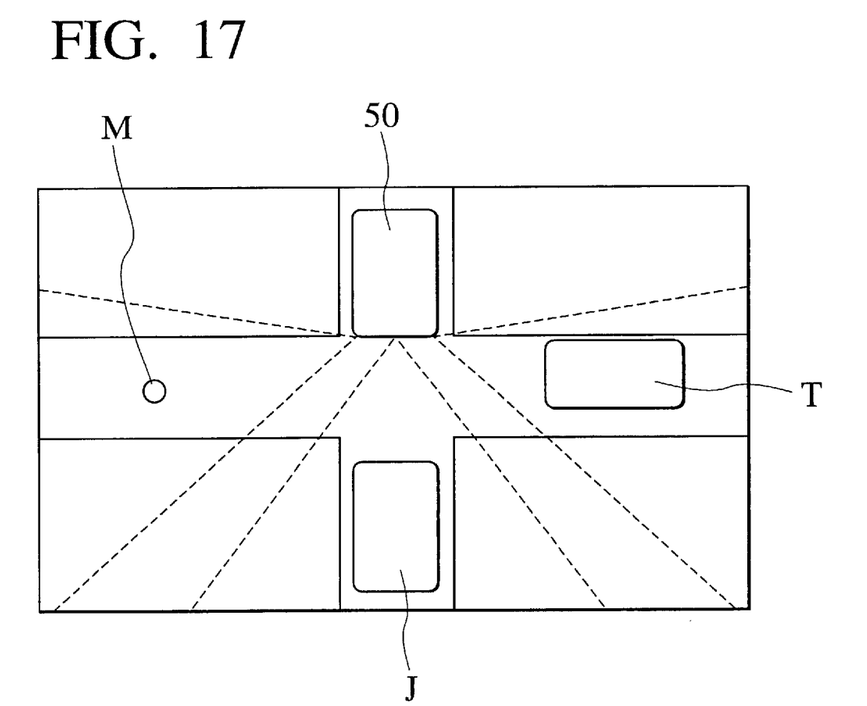
FIG. 17 is a diagram showing an image pickup range in the third embodiment.

In this manner, even at a crossing surrounded by walls and having a field of view which is shielded as shown in FIG. 17, when the rear end of the vehicle is slightly stuck into the backward road, the road situations in the left and right backward directions are picked up by the CCD camera as images to be displayed on the display device.

Figure 18:
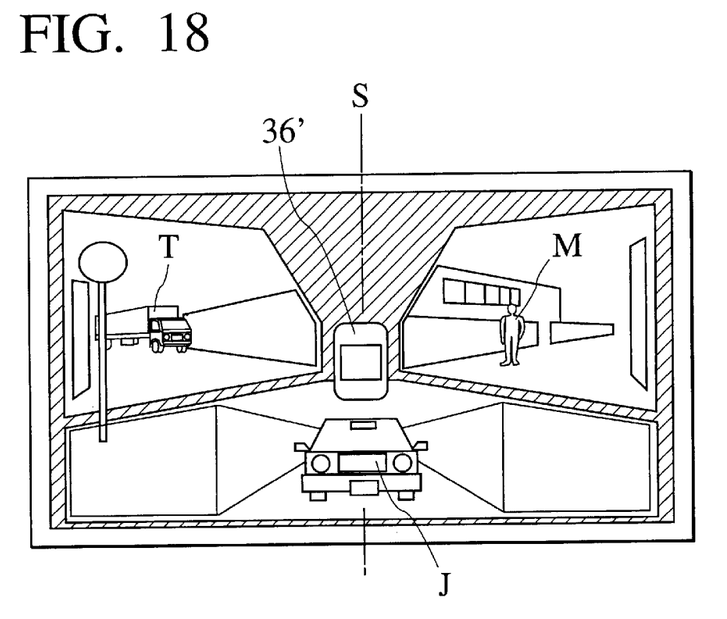
FIG. 18 is a diagram showing a display image obtained by synthesizing a pickup video image, a trimming video image, and a vehicle image in the third embodiment with each other.

In the situation shown in FIG. 17, since a man M in the left direction, a track T in the right direction, and another J in the backward direction are in the image pickup ranges of the CCD cameras 101', 201', and 401, respectively, for example, a display image shown in FIG. 18 can be obtained on the display device 70. When the image is observed, it is understood that the track T and the man M are present in the right and left rears of the vehicle. From the video image displayed on the lower part of the display screen, it is confirmed that the other vehicle J is present just behind the own vehicle.

Also, in this embodiment, by a window-frame-shaped mask and a formed vehicle video image, a feeling of direction can be given to the left and right video images displayed on the display screen. Since a just backward video image is displayed on the lower part of the display screen, an amount of information increases, and the backward video images can be checked at the same time. When the three video images are seen, the information of the almost entire area in the left and right backward directions can be obtained.

Since the vehicle image obtained by viewing the vehicle from the top is used as a vehicle image, the shape the vehicle image is different from the shape of a picked rear vehicle image, and the vehicle images can be advantageously prevented from being confused with each other.

Figure 19:
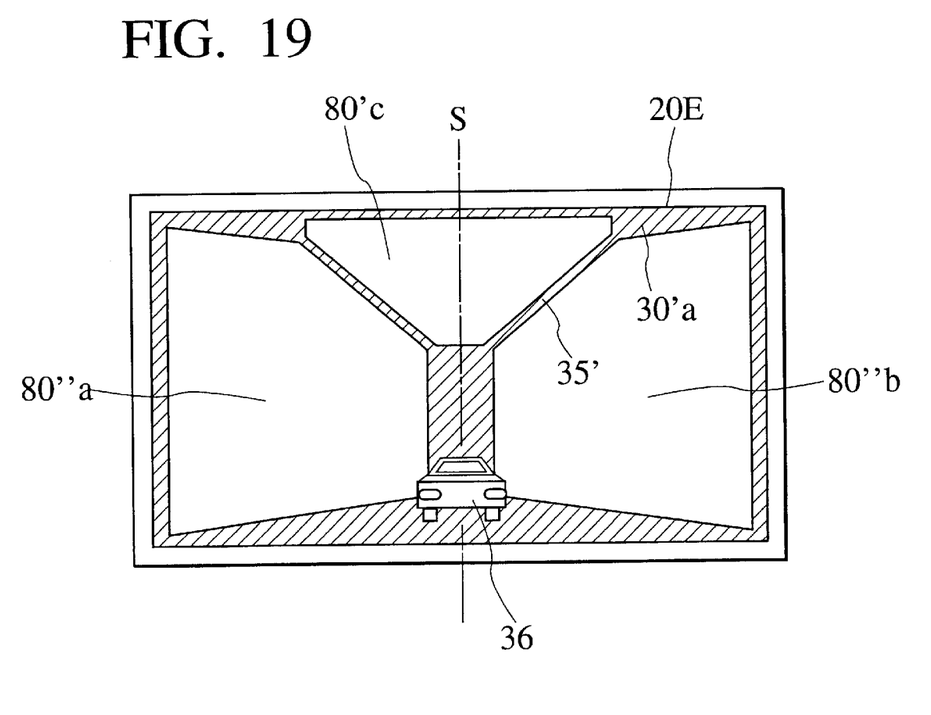
FIG. 19 is a diagram showing a modification of a mask region.

FIG. 19 shows a modification of the arrangement of display regions. In the third embodiment, the display region of a just backward video image is set in the lower part of the display screen. In this modification, in a mask region 20E, a display region 80'C for displaying a backward image is set in an upper part of the display screen, i.e., in a portion extending from a width-extending portion 35' of a central mask region to an upper mask region 30'a.

The display region 80'C has a triangular shape whose angles are cut, and is separated from left and right display regions 80"a and 80"b by mask regions having equal widths. A mask region is also formed on the upper side of the display region 80'C, so that the display region 80'C is an independent display region whose edge is partitioned by the mask region.

As in FIG. 7, a vehicle image 36 obtained by viewing the vehicle from behind is synthesized with a trimming video image such that the vehicle image 36 is positioned at a crossing portion between the upper edge of the lower mask region and the side edge of the central mask region.

Since the just backward image is displayed on the upper part of the display screen, the image is spaced apart from the vehicle image 36 displayed on the lower part. When the vehicle image obtained by viewing the vehicle from behind is displayed, the vehicle image is not confused with the pickup video image, and recognition that a driver sees the left and right video images is improved by the vehicle image 36 obtained by viewing the vehicle from behind.

In each of the embodiments, the upper edge of the lower mask region in the trimming video image is a straight inclined line. However, the upper edge is not limited to the straight inclined line, and the upper edge may be constituted by a plurality of straight lines or a curved line.

Japanese Patent Applications P10-142577 (filed May 25, 1998) is incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A surrounding monitor apparatus for a vehicle, comprising:
    an image pickup device for picking up images in a plurality of different directions from a vehicle;
    an image forming device for forming a trimming video image picked up by the image pickup device and including mask regions having the shapes of vehicle windows corresponding to the plurality of directions and a vehicle image;
    an image synthesizing device for overlapping the trimming video image and the vehicle image formed by the image forming device on the plurality of video images picked up by the image pickup device to form a synthesized image; and
    a display device for displaying the synthesized image from the image synthesizing device, wherein
    the plurality of directions in which the image pickup device picks up images includes a left direction and a right direction,
    the mask region is constituted by an upper mask region for shielding an upper region of a display screen, a lower mask region for shielding a lower region of the display screen, a central mask region for shielding a central region of the display screen, a right mask region for shielding a region along a right side of the display screen, and a left mask region for shielding a region along a left side of the display screen to form display regions having left and right side window shapes of the vehicle, the image synthesizing device makes a synthesized image by arranging the left and right direction video images picked by the image pickup device on the left and right side display regions, respectively, and the upper mask region has lower edges inclined upward from a connection point between the upper mask region and the central mask region to the left and right sides.

2. A surrounding monitor apparatus for a vehicle according to claim 1, wherein the lower edges of the upper mask region are constituted by a plurality of straight lines having different inclinations.

3. A surrounding monitor apparatus for a vehicle, comprising:

an image pickup device for picking up images in a plurality of different directions from a vehicle;

an image forming device for forming a trimming video image picked up by the image pickup device and including mask regions having the shapes of vehicle windows corresponding to the plurality of directions and a vehicle image;

an image synthesizing device for overlapping the trimming video image and the vehicle image formed by the image forming device on the plurality of video images picked up by the image pickup device to form a synthesized image; and a display device for displaying the synthesized image from the image synthesizing device, wherein the plurality of directions in which the image pickup device picks up images are a left direction and a right direction, the mask region is constituted by an upper mask region for shielding an upper region of a display screen, a lower mask region for shielding a lower region of the display screen, a central mask region for shielding a central region of the display screen, a right mask region for shielding a region along a right side of the display screen, and a left mask region for shielding a region along a left side of the display screen to form display regions having left and right side window shapes of the vehicle, the image synthesizing device makes a synthesized image by arranging the left and right direction video images picked by the image pickup device on the left and right side display regions, respectively, and the lower mask region has upper edges inclined downward from a connection point between the lower mask region and the central mask region to the left and right sides.

4. A surrounding monitor apparatus for a vehicle, comprising:

an image pickup device for picking up images in a plurality of different directions from a vehicle;

an image forming device for forming a trimming video image picked up by the image pickup device and including mask regions having the shapes of vehicle windows corresponding to the plurality of directions and a vehicle image;

an image synthesizing device for overlapping the trimming video image and the vehicle image formed by the image forming device on the plurality of video images picked up by the image pickup device to form a synthesized image; and a display device for displaying the synthesized image from the image synthesizing device, wherein the plurality of directions in which the image pickup device picks up images are a left direction and a right direction, the mask region is constituted by an upper mask region for shielding an upper region of a display screen, a lower mask region for shielding a lower region of the display screen, a central mask region for shielding a central region of the display screen, a right mask region for shielding a region along a right side of the display screen, and a left mask region for shielding a region along a left side of the display screen to form display regions having left and right side window shapes of the vehicle, the image synthesizing makes a synthesized image by arranging the left and right direction video images picked by the image pickup device on the left and right side display regions, respectively, and the central mask region has a width-extending portion whose width increases upward up the lower edge of the mask region.

5. A surrounding monitor apparatus for a vehicle according to claim 4, wherein a side edge of the width-extending portion is constituted by a straight line.

6. A surrounding monitor apparatus for a vehicle according to claim 4, herein a side edge of the width-extending portion is constituted by a curved line.

7. A surrounding monitor apparatus for a vehicle according to claim 6, wherein the vehicle image is displayed on a lower part of the central mask region.

* * * * *